(12) United States Patent
Voermans

(10) Patent No.: US 7,954,524 B2
(45) Date of Patent: Jun. 7, 2011

(54) MOTORS AND PROCESSING UNITS FOR PROCESSING TREES

(75) Inventor: Grant William Voermans, Medford, WI (US)

(73) Assignee: Caterpillar Forest Products Inc., Peoria, IL (US)

( * ) Notice: Subject to any disclaimer, the term of this patent is extended or adjusted under 35 U.S.C. 154(b) by 173 days.

(21) Appl. No.: 12/314,757

(22) Filed: Dec. 16, 2008

(65) Prior Publication Data

US 2010/0147420 A1    Jun. 17, 2010

(51) Int. Cl.
*B23Q 15/00* (2006.01)
*A01G 23/08* (2006.01)

(52) U.S. Cl. ...... 144/382; 144/4.1; 144/34.1; 144/24.13

(58) Field of Classification Search ............ 144/4.1, 144/34.1, 208.1, 208.4, 246.1, 246.2, 247–248.6, 144/382, 392, 394, 402, 404, 24.13
See application file for complete search history.

(56) References Cited

U.S. PATENT DOCUMENTS

| | | | |
|---|---|---|---|
| 3,482,611 A | 12/1969 | Hamilton | |
| 3,720,247 A | 3/1973 | Lindblom | |
| 3,972,357 A | 8/1976 | Neal et al. | |
| 4,044,806 A | 8/1977 | Savage et al. | |
| 4,257,461 A | 3/1981 | Wangeby et al. | |
| 4,742,854 A | 5/1988 | Forslund | |
| 5,058,638 A | 10/1991 | Hacker et al. | |
| 5,082,036 A | 1/1992 | Vierikko | |
| 5,148,843 A | 9/1992 | Cote | |
| 5,785,101 A * | 7/1998 | Wildey | 144/4.1 |
| 5,797,438 A | 8/1998 | Dye | |
| 5,901,535 A | 5/1999 | Duckinghaus et al. | |
| 5,936,398 A * | 8/1999 | Bellefeuille | 324/206 |
| 5,954,105 A * | 9/1999 | Smith et al. | 144/4.1 |
| 5,957,177 A * | 9/1999 | Smith et al. | 144/248.7 |
| 6,062,793 A | 5/2000 | Isley | |
| 6,065,513 A * | 5/2000 | Paakkunainen | 144/24.13 |
| 6,345,651 B1 | 2/2002 | Havimaki et al. | |
| 6,814,112 B2 | 11/2004 | Johansson | |
| 6,962,178 B2 | 11/2005 | Duval | |
| 2007/0125447 A1* | 6/2007 | Alfthan | 144/343 |
| 2007/0251600 A1 | 11/2007 | Lennartsson | |
| 2008/0128051 A1 | 6/2008 | Isley et al. | |

FOREIGN PATENT DOCUMENTS

WO    02/45482 A1    6/2002
WO    2006/092469 A1    9/2006

* cited by examiner

*Primary Examiner* — Shelley Self
(74) *Attorney, Agent, or Firm* — Finnegan, Henderson, Farabow, Garrett & Dunner LLP

(57) ABSTRACT

A motor for a tree processing machine is provided. The motor includes a mechanism configured to drive a wheel. The wheel is configured to engage a portion of a tree. The motor also includes a housing containing the mechanism. The motor further includes an encoder. The encoder is configured to be operably coupled to the mechanism. The encoder is also configured to generate a signal indicative of a length of a portion of a tree engaged by the wheel. The encoder is contained in the housing.

20 Claims, 4 Drawing Sheets

MOTORS AND PROCESSING UNITS FOR PROCESSING TREES

TECHNICAL FIELD

The present disclosure relates generally to motors and processing units, and more particularly, to motors and processing units for processing trees.

BACKGROUND

A tree processing machine, such as, for example, a forestry harvester, may be used to fell and/or process trees. For example, a tree processing machine may include a tree processing unit (e.g., a tree processing head) used to cut off a tree trunk near its base, remove at least a portion of the bark and/or limbs from the tree, and/or cut the tree's trunk into a number of sections based, for example, on length. Some forestry harvesters may include, for example, a robust all-terrain vehicle that may be driven via wheels and/or tracks. For example, some forestry harvesters may include an articulated chassis to provide tight turning capability for maneuvering around obstacles. Some forestry harvesters may include a compression-ignition engine providing power for propelling the harvester as well as a tree processing head, for example, via a hydraulic drive mechanism. The tree processing unit may be coupled to the forestry harvester via a boom, such as an extensible, articulated boom, which facilitates movement of the tree processing unit for engaging the tree, cutting the tree off near the ground, and processing the tree. For example, some forestry harvesters are adaptations of existing excavators, which have been modified by replacing a bucket with a tree processing unit, and other forestry harvesters are purpose-built machines.

A typical processing unit may include, for example, a feed roller configured to feed a portion of a tree trunk through the processing unit. The feed roller may include a wheel configured to grip and rotate as the tree trunk is fed through the processing unit, and the feed roller may be operably associated with a sensor configured to generate signals indicative of the length of travel of the tree trunk through the processing unit. For example, the feed roller may be associated with a rotary encoder that may include an electro-mechanical device configured to convert angular displacement of the feed roller into an analog or digital signal to facilitate determination of the length of tree trunk passing through the processing unit.

Such encoders are conventionally mounted on a shaft associated with the feed roller in a manner such that they are exposed to the environment and/or vibrations associated with operation of the forestry harvester. Because encoders may include electronic devices, however, they may be sensitive to vibrations associated with the environment and/or operation of the forestry harvester. This may interfere with reliable operation of the encoder and/or prematurely result in damage to the encoder.

For example, U.S. Pat. Pub. No. 2008/0128051 to Isley et al., published on Jun. 5, 2008 ("the '051 application"), discloses a system for measuring the length of a tree being processed through a delimber. The delimber in the '051 application includes a log feed roller for moving the tree, a delimbing head for delimbing the tree, and a measuring wheel mounted on the delimbing head. Although the measuring wheel disclosed in the '051 application may provide measurements of the length of the tree being processed, because the measuring wheel is mounted on the delimbing head, it may be exposed to the harsh conditions during the operation of the delimber, and the measurement provided by the measuring wheel may be subjected to influence by machine vibrations.

The apparatuses of the present disclosure may be directed toward improvements in the existing technology.

SUMMARY

In one aspect, the present disclosure is directed to a motor for a tree processing machine. The motor may include a mechanism configured to drive a wheel. The wheel may be configured to engage a portion of a tree. The motor may also include a housing containing the mechanism. The motor may further include an encoder. The encoder may be configured to be operably coupled to the mechanism. The encoder may also be configured to generate a signal indicative of a length of a portion of a tree engaged by the wheel. The encoder may be contained in the housing.

In another aspect, the present disclosure is direct to a processing unit for a tree processing machine. The processing unit may include a wheel configured to engage at least a portion of a tree. The processing unit may also include a motor operably coupled to the wheel. The motor may include a mechanism configured to drive the wheel. The motor may also include a housing containing the mechanism. The motor may further include an encoder operably coupled to the mechanism. The encoder may be configured to generate a signal indicative of a length of at least a portion of the tree. The encoder may be contained within the housing. The processing unit may further include a processing device operably coupled to the encoder. The processing device may be configured to process the tree.

In yet another aspect, the present disclosure is directed to a tree processing machine. The machine may include a chassis. The machine may also include a coupling member defining a first end and a second end. The chassis may be operably coupled to the first end of the coupling member. The machine may further include a processing unit operably coupled to the second end of the coupling member. The processing unit may include at least one wheel configured to engage a portion of a tree. The processing unit may also include at least one motor operably coupled to the at least one wheel. The at least one motor may include a mechanism configured to drive the at least one wheel. The at least one motor may also include a housing containing the mechanism. The at least one motor may further include an encoder operably coupled to the mechanism. The encoder may be configured to generate a signal indicative of a length of at least a portion of the tree. The encoder may also be contained within the housing. The processing unit may further include at least one processing device operably coupled to the encoder. The at least one processing device may be configured to process the tree.

DETAILED DESCRIPTION

Figure 1:
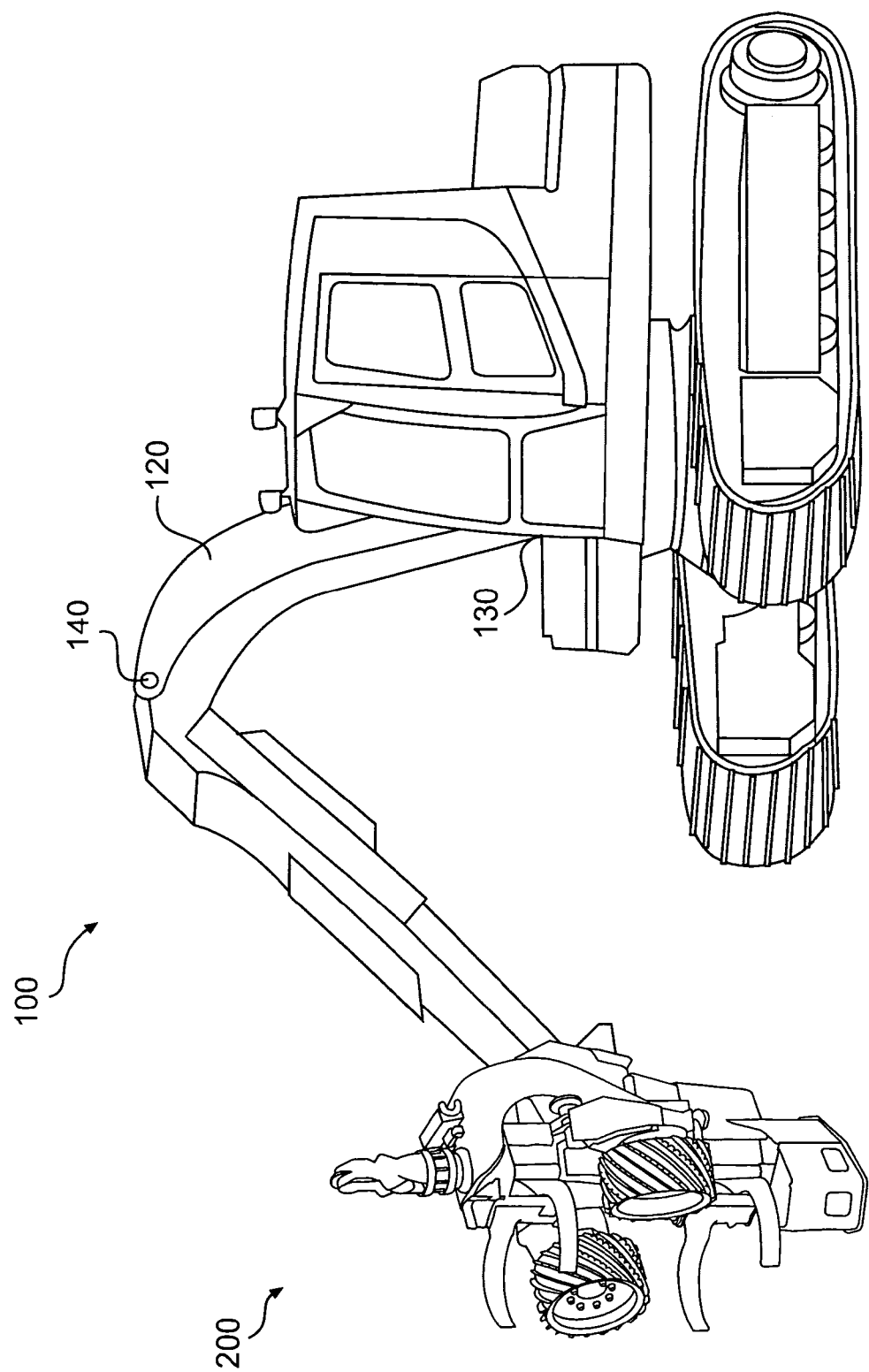
FIG. 1 is a schematic representation of an exemplary embodiment of a tree processing machine.

An exemplary embodiment of a tree processing machine 100 is schematically illustrated in FIG. 1. Tree processing machine 100 may include a chassis 110 and a tree processing unit 200. Chassis 110 may be a fixed or mobile machine. For example, chassis 110 may include wheels and/or tracks and may be similar to a chassis used in association with an excavator, a dozer, a wheel loader, a backhoe loader, an integrated tool carrier, a skid-steer loader, or any other machine known to those having skill in the art. Exemplary tree processing unit 200 may be configured to cut off a tree trunk near its base, remove at least a portion of the bark and/or limbs from the tree, and/or cut the tree's trunk into a number of sections based, for example, on length.

As schematically illustrated in FIG. 1, exemplary tree processing unit 200 may be coupled to chassis 110 via a coupling member 120. Coupling member 120 may be one of a plurality of removably attachable coupling elements. According to some embodiments, coupling member 120 may be a hydraulically (or mechanically) operated boom. Coupling member 120 may include a first end 130 and a second end 140. According to some embodiments, chassis 110 may be operably coupled to first end 130 and tree processing unit 200 may be operably coupled to second end 140. It is contemplated that while FIG. 1 depicts only a single coupling member 120, chassis 110 and tree processing unit 200 may be coupled to one another via a plurality of coupling members and/or via other devices configured to couple tree processing unit 200 to chassis 110.

Figure 2:
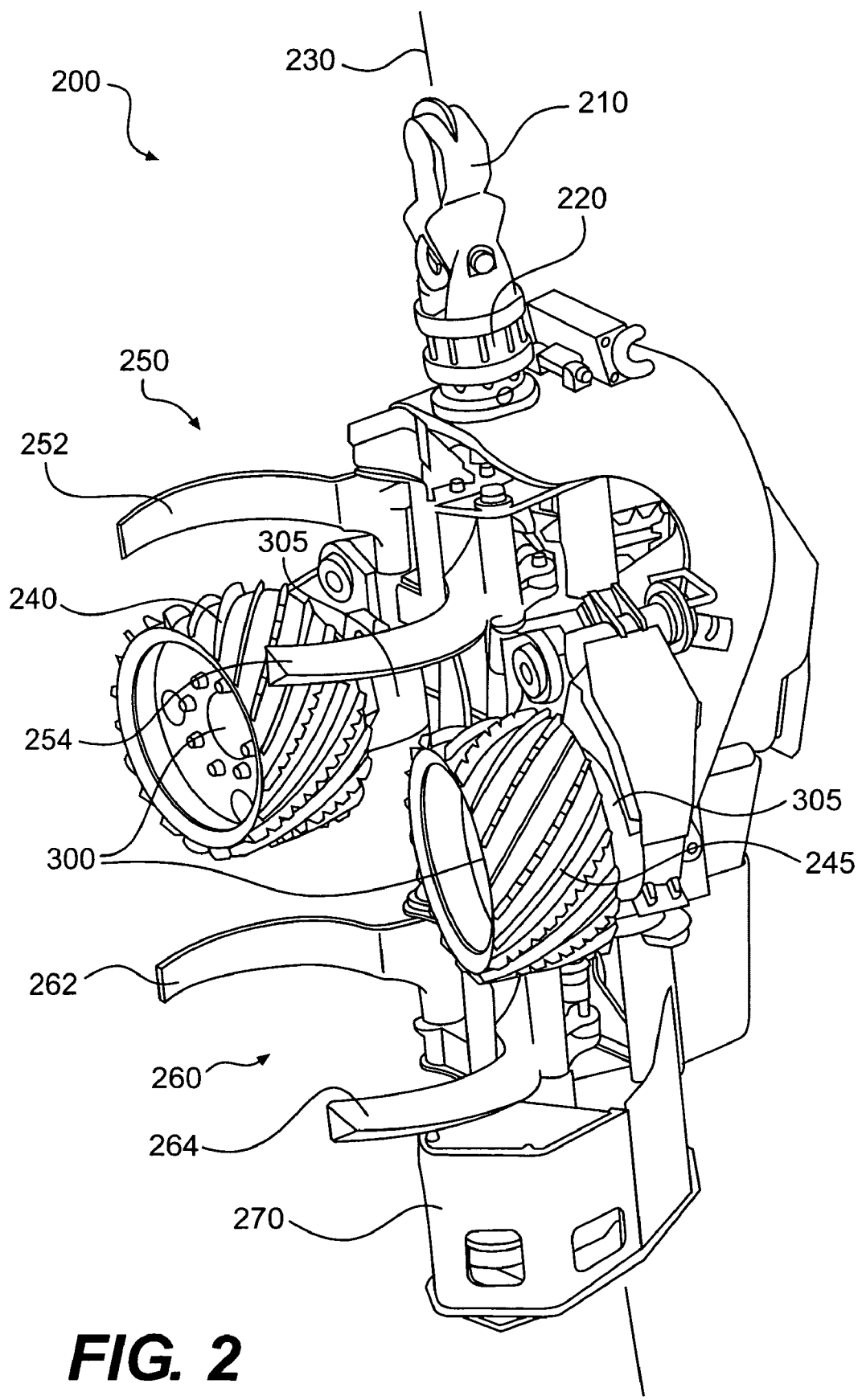
FIG. 2 is a schematic representation of an exemplary embodiment of a tree processing unit that may be included in the tree processing machine of FIG. 1.

FIG. 2 schematically illustrates an exemplary embodiment of tree processing unit 200. For example, exemplary tree processing unit 200 includes a linkage member 210 and a rotary member 220. Linkage member 210 may operably couple tree processing unit 200 to coupling member 120, and rotary member 220 may facilitate the rotation of tree processing unit 200 about an axis 230. Exemplary tree processing unit 200 may also include one or more wheels (e.g., feed rollers 240 and 245) configured to receive and engage a portion of a tree and feed the portion of the tree in the direction of axis 230 along tree processing unit 200. Exemplary feed rollers 240 and 245 may each include a motor 305 operably coupled to feed rollers 240 and 245. In some embodiments, motor 305 may include a mechanism 300 (e.g., a drive shaft) configured to drive feed rollers 240 and 245.

Exemplary tree processing unit 200 shown in FIG. 2 may also include, for example, cutting devices 250 and 260. According to some embodiments, cutting device 250 may include a pair of delimbing (or debarking) knives 252 and 254 configured to remove bark and/or limbs from a tree trunk as it is fed through tree processing unit 200. Similarly, cutting device 260 may include a pair of delimbing (or debarking) knives 262 and 264 configured to remove bark and/or limbs from a tree trunk as it is fed through tree processing unit 200. According to some embodiments, tree processing unit 200 may include an additional cutting device 270. For example, exemplary tree processing unit 200 shown in FIG. 2 includes cutting device 270, which may be in the form of a saw, a blade, and/or a knife, configured to cut a tree trunk off near the ground and/or into a number of sections as the tree trunk passes through tree processing unit 200.

Figure 3:
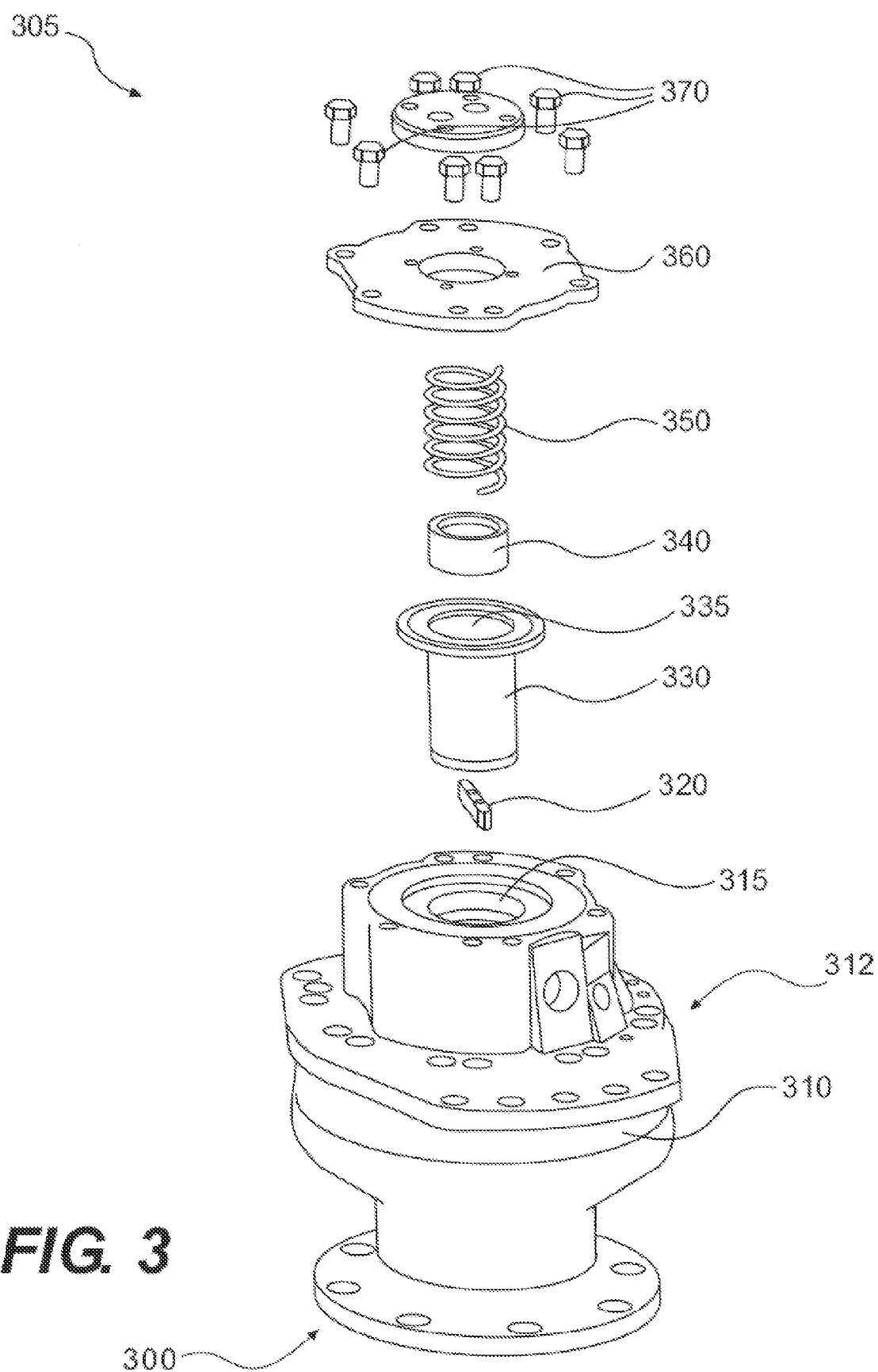
FIG. 3 is a schematic representation of an exemplary embodiment of a motor that may be included in the tree processing unit of FIG. 2.

FIG. 3 schematically illustrates an exemplary embodiment of motor 305 incorporated into exemplary tree processing unit 200 shown in FIG. 2. Exemplary motor 305 may be, for example, an internal combustion engine, a hydraulic motor, an electric motor, or any suitable type of motor known to those skilled in the art. Exemplary motor 305 shown in FIG. 3 includes a base member 310 defining a motor housing 312 configured to house, for example, an engine, a hydraulic motor, or an electric motor. Motor housing 312 defines an opening 315 configured to receive an encoder housing 330. For example, encoder housing 330 may be generally hollow and generally cylindrical in shape. Alternatively, encoder housing 330 may assume any appropriate geometric shape.

Exemplary encoder housing 330 defines an opening 335 at one end, and a measuring mechanism for measuring a length of a portion of a tree being processed by tree processing unit 200 may be disposed within housing 330 via opening 335. For example, an encoder 340 may be received within housing 330 along with an indicator 320 and an isolation member 350. According to some embodiments, indicator 320 may include, for example, a magnet configured to rotate as motor 305 rotates to drive one or more of feed rollers 240 and 245. Encoder 340 may be operably coupled to indicator 320 (e.g., by virtue of encoder 340 sensing displacement and/or rotation of indicator 320) and may be configured to sense rotation of indicator 320 and generate signals indicative of the rate and/or magnitude of angular displacement of motor 305. For example, encoder 340 may be a contact-less encoder, such as, for example, an encoder marketed under the trade name HOCKEY PUCK ENCODER™ by Joral Devices, LLC. Such an encoder is a rotary encoder that does not contact surfaces of an object being measured, such that vibrations and shock from the measured surfaces are not transmitted directly to electronics within the encoder. Alternatively, other devices known to those skilled in the art for generating signals indicative of rate and/or magnitude of angular displacement of motor 305 may be used.

According to some embodiments, housing 330 may receive isolation member 350. Isolation member 350 may include a spring, a damper, and/or a shock absorber, or any other similar device known to those having skill in the art. For example, isolation member 350 may be engaged with encoder 340 and may be configured to reduce transmission of vibrations to encoder 340 during the operation of tree processing unit 200. As illustrated in FIG. 3, isolation member 350 may define two ends—one end associated with (e.g., abutting) encoder 340 and the other end associated with (e.g., abutting) a plate member 360.

As shown in FIG. 3, fasteners 370 may be employed to secure plate member 360 to base member 310, such that isolation member 350, encoder 340, housing 330, and indicator 320 may be secured within base member 310. Fasteners 370 may be screws, bolts, rivets, nails, pins, and/or any other appropriate devices configured to secure plate member 360 to base member 310.

Figure 4:
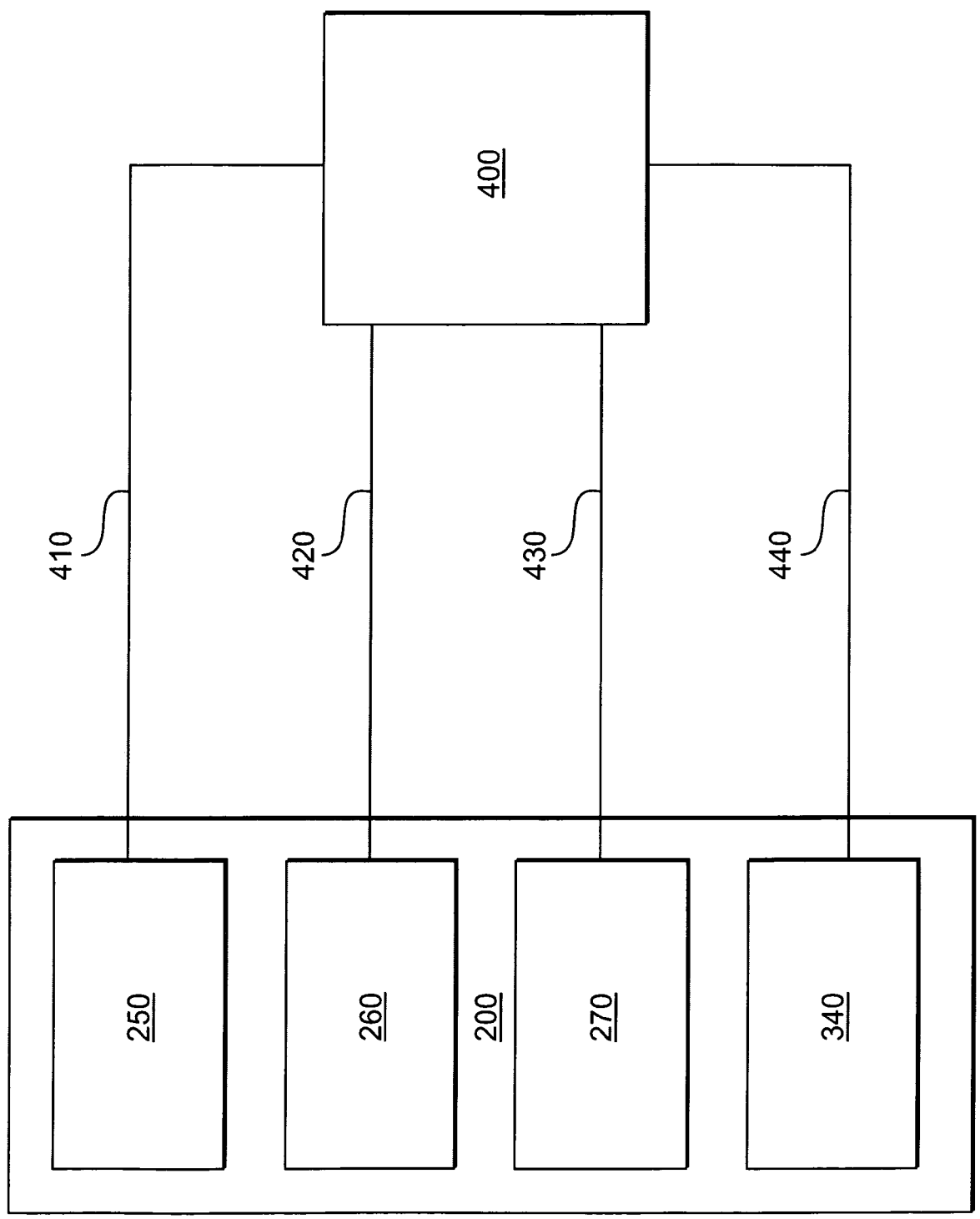
FIG. 4 is a schematic representation of an exemplary embodiment of a control unit that may be used with the tree processing unit of FIG. 2.

According to the exemplary embodiment shown in FIGS. 2 and 3, as a tree moves along axis 230 of exemplary tree processing unit 200 (see, e.g., FIG. 2), encoder 340 may generate one or more signals 440 (see FIG. 4) indicative of a length of a portion of the tree being fed through tree processing unit 200. As shown in FIG. 4, for example, a control unit 400 may be provided to at least partially control and/or operate tree processing unit 200. For example, control unit 400 may be configured to receive signals 440 from encoder 340. Signals 440 may be indicative of a length of a portion of a tree being processed by tree processing unit 200. According to some embodiments, control unit 400 may generate signals 410, 420, and 430. Control unit 400 may transmit signals 410, 420, and 430 to one or more of cutting devices 250, 260, and 270, respectively, to facilitate delimbing of the tree and/or cutting of the tree into a plurality of portions. The tree may be cut into portions of equal length or portions of unequal length, depending on, for example, signals 410, 420, and 430. It is contemplated that control unit 400 may be operated manually (e.g., with real-time operator input) and/or automatically (e.g., without real-time operator input). According to some embodiments, control unit 400 may be associated with tree processing unit 200 (e.g., it may be incorporated into tree processing unit 200). According to some embodiments, control unit 400 may be included in a control system (not shown) associated with chassis 110 (e.g., incorporated into an operator interface on chassis 110) and/or a control system located remotely from tree processing machine 100.

INDUSTRIAL APPLICABILITY

The exemplary disclosed processing unit and motor may be used in any application where it may be desirable to isolate the encoder or other transducer from vibrations and/or harsh environments experienced by, for example, a tree processing machine during operation. For example, because encoder 340 may be disposed within housing 330, encoder 340 may be isolated from vibration and/or harsh environments during operation of tree processing unit 200. The location of encoder 340 within housing 330 may help to improve the accuracy of measurement of a length of a tree being processed by tree processing unit 200. The location of encoder 340 within housing 330 may also help to increase reliability of encoder 340 as encoder 340 would be protected from exposure to the harsh forestry environment during operation of tree processing unit 200. Also, because a contact-less encoder does not contact measured surfaces such that vibrations and shock from the measured surfaces would not be transmitted directly to the electronics within the encoder, the use of a contact-less encoder may help to improve the accuracy of measurement of the length of the tree being processed by tree processing unit 200.

It will be apparent to those skilled in the art that various modifications and variations can be made in the disclosed motors and processing units. Other embodiments will be apparent to those skilled in the art from consideration of the specification and practice of the disclosed embodiments herein. It is intended that the specification and examples be considered as exemplary only, with a true scope of the disclosure being indicated by the following claims.

What is claimed is:

1. A drive motor for a tree processing machine, the drive motor comprising:
    a mechanism configured to transfer rotation to a wheel, the wheel being configured to engage a portion of a tree;
    a housing containing the mechanism; and
    an encoder configured to monitor the mechanism and generate a signal indicative of a length of the portion of the tree engaged by the wheel,
    wherein the encoder is contained in the housing.

2. The drive motor of claim 1, further including an isolation member configured to isolate the encoder from vibration.

3. The drive motor of claim 2, wherein the isolation member is contained within the housing.

4. The drive motor of claim 2, wherein the isolation member is at least one of a spring, a damper, and a shock-absorber.

5. The drive motor of claim 1, wherein the encoder is a contact-less encoder.

6. A processing unit for a tree processing machine, the processing unit comprising:
    a wheel configured to engage at least a portion of a tree;
    a drive motor operably coupled to the wheel, the drive motor including:
        a mechanism configured to transfer rotation to the wheel,
        a housing containing the mechanism, and
        an encoder configured to monitor the mechanism and generate a signal indicative of a length of the at least a portion of the tree, the encoder being contained within the housing; and
    a processing device operably coupled to the encoder, the processing device being configured to process the tree.

7. The processing unit of claim 6, further including a control unit operably coupled to the encoder and the processing device, the control unit being configured to receive the signal from the encoder and provide signals to the processing device to process the tree based on the signal received from the encoder.

8. The processing unit of claim 6, wherein the processing device includes a cutting device configured to remove a limb from the tree.

9. The processing unit of claim 6, wherein the processing device includes a cutting device configured to cut off a portion of a length of the tree.

10. The processing unit of claim 6, further including an isolation member configured to isolate the encoder from vibration.

11. The processing unit of claim 10, wherein the isolation member is at least one of a spring, a damper, and a shock-absorber.

12. The processing unit of claim 6, wherein the encoder is a contact-less encoder.

13. A tree processing machine comprising:
    a chassis;
    a coupling member defining a first end and a second end, the chassis being operably coupled to the first end of the coupling member; and
    a processing unit operably coupled to the second end of the coupling member, the processing unit including:
        at least one wheel configured to engage a portion of a tree,
        at least one drive motor operably coupled to the at least one wheel, the at least one drive motor including:
            a mechanism configured to transfer rotation to the at least one wheel,
            a housing containing the mechanism, and
            an encoder configured to monitor the at least one mechanism and generate a signal indicative of a length of at least a portion of the tree, the encoder being contained within the housing; and
        at least one processing device operably coupled to the encoder, the at least one processing device being configured to process the tree.

14. The tree processing machine of claim 13, further including a control unit operably coupled to the encoder and the at least one processing device, the control unit being configured to:
    receive the signal from the encoder; and
    provide signals to the at least one processing device to process the tree based on the signal received from the encoder.

15. The tree processing machine of claim 13, wherein the at least one processing device includes a cutting device configured to remove a limb from the tree.

16. The tree processing machine of claim 13, wherein the at least one processing device includes a cutting device configured to cut off a portion of a length of the tree.

17. The tree processing machine of claim 13, further including an isolation member contained within the housing.

18. The processing unit of claim 13, wherein the encoder is a contact-less encoder.

19. The drive motor of claim 1, wherein the mechanism includes a drive shaft.

20. The processing unit of claim 6, wherein the mechanism includes a drive shaft.

* * * * *